United States Patent [19]

Webb

[11] Patent Number: 4,892,267

[45] Date of Patent: Jan. 9, 1990

[54] COMBINATION FISHING REEL

[76] Inventor: Charles A. Webb, 21 Amherst St., Nashua, N.H. 03060

[21] Appl. No.: 149,493

[22] Filed: Jan. 28, 1988

Related U.S. Application Data

[63] Continuation-in-part of Ser. No. 99,497, Sep. 27, 1987, abandoned.

[51] Int. Cl.⁴ .............................................. A01K 89/01
[52] U.S. Cl. .................................... 242/228; 242/232; 242/241
[58] Field of Search ............ 242/84.2 D, 84.41, 84.42, 242/84.43, 84.21 R, 84.2 G

[56] References Cited

U.S. PATENT DOCUMENTS

| | | | |
|---|---|---|---|
| 1,755,195 | 4/1930 | Stanley | 242/84.21 R |
| 1,898,316 | 2/1933 | Schafer | |
| 1,964,965 | 7/1934 | Smelser | 242/84.4 |
| 2,732,147 | 1/1956 | Rotter | 242/84.21 R |
| 2,931,592 | 4/1960 | Sloan | 242/84.21 R |
| 2,974,534 | 3/1961 | Clickner | 242/84.21 R |
| 4,108,392 | 8/1978 | Masclet | 242/84.21 A |
| 4,153,219 | 5/1979 | Kamikawa | 242/84.51 R |
| 4,577,807 | 3/1986 | Urso | 242/84.21 R |
| 4,638,958 | 1/1987 | Furomoto | 242/84.1 R |

Primary Examiner—Joseph J. Hail, III
Assistant Examiner—Katherine Matecki
Attorney, Agent, or Firm—Michael Sheldon

[57] ABSTRACT

A fishing reel recovers line by rotating a spool mounted on a housing. The spool is positioned on the housing so that line can be discharged in a direction approximately parallel to the axis of the spool. When line is retrieved, a guide mechanism straightens line and distributes it onto the spool by traversing along the length of the spool's axis.

16 Claims, 7 Drawing Sheets

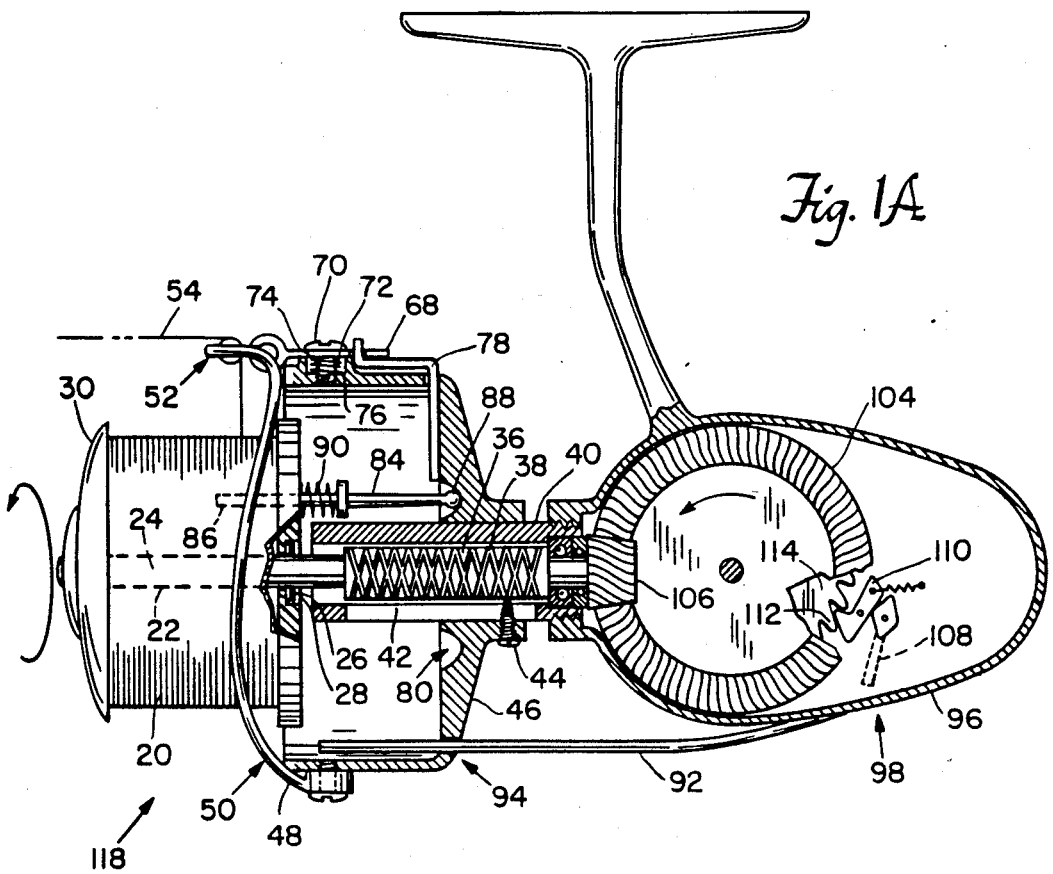

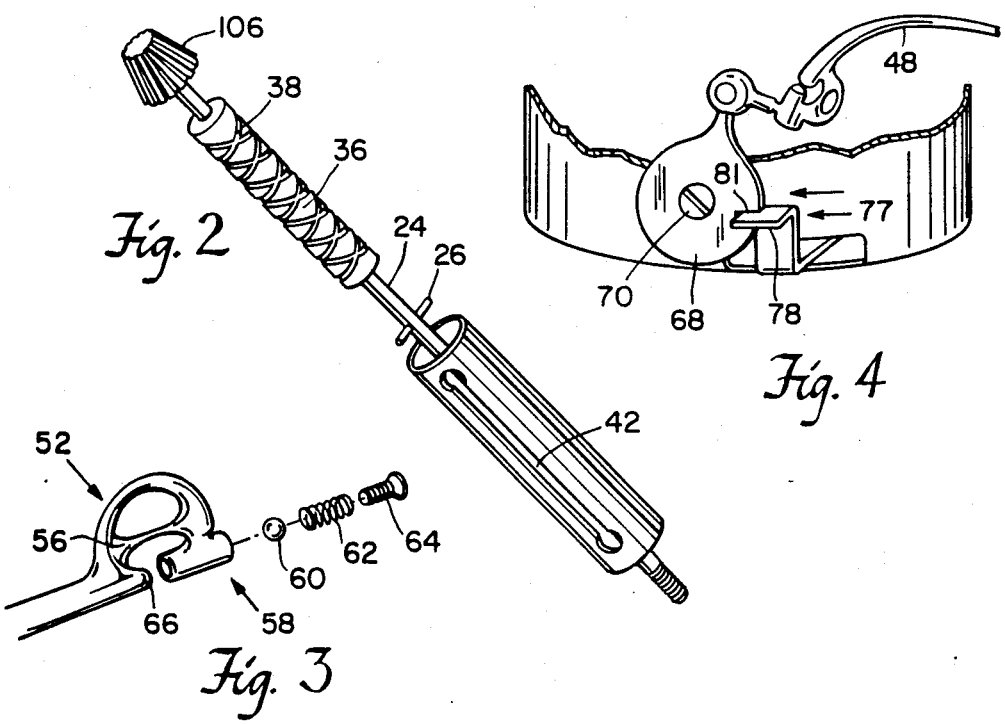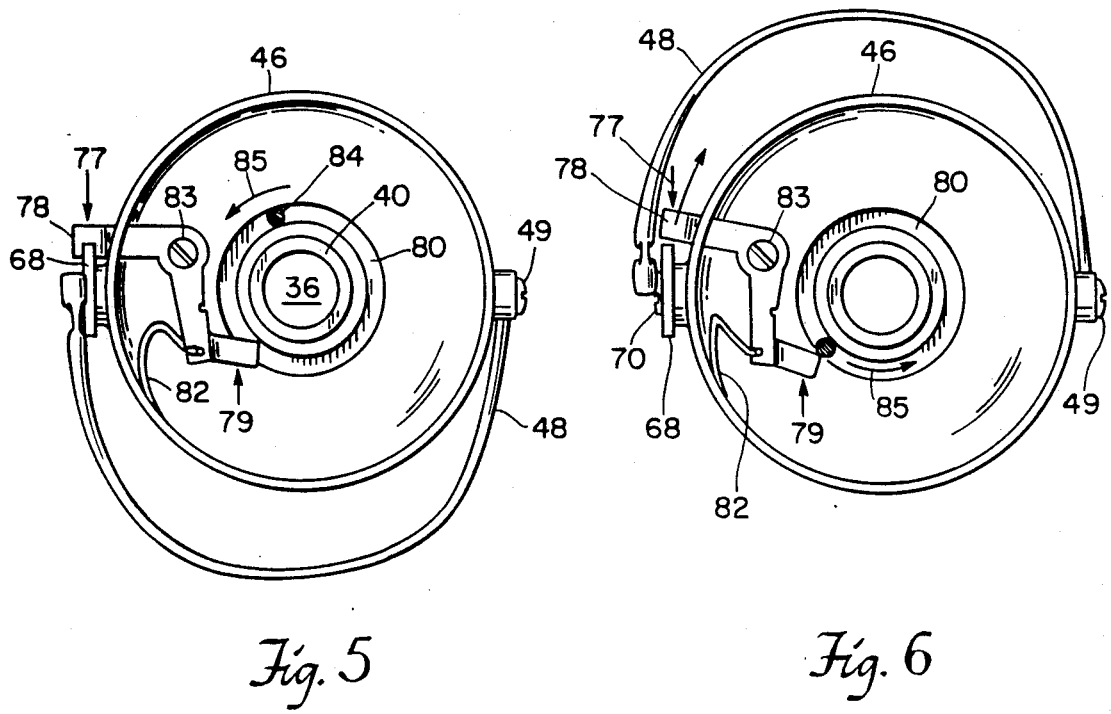

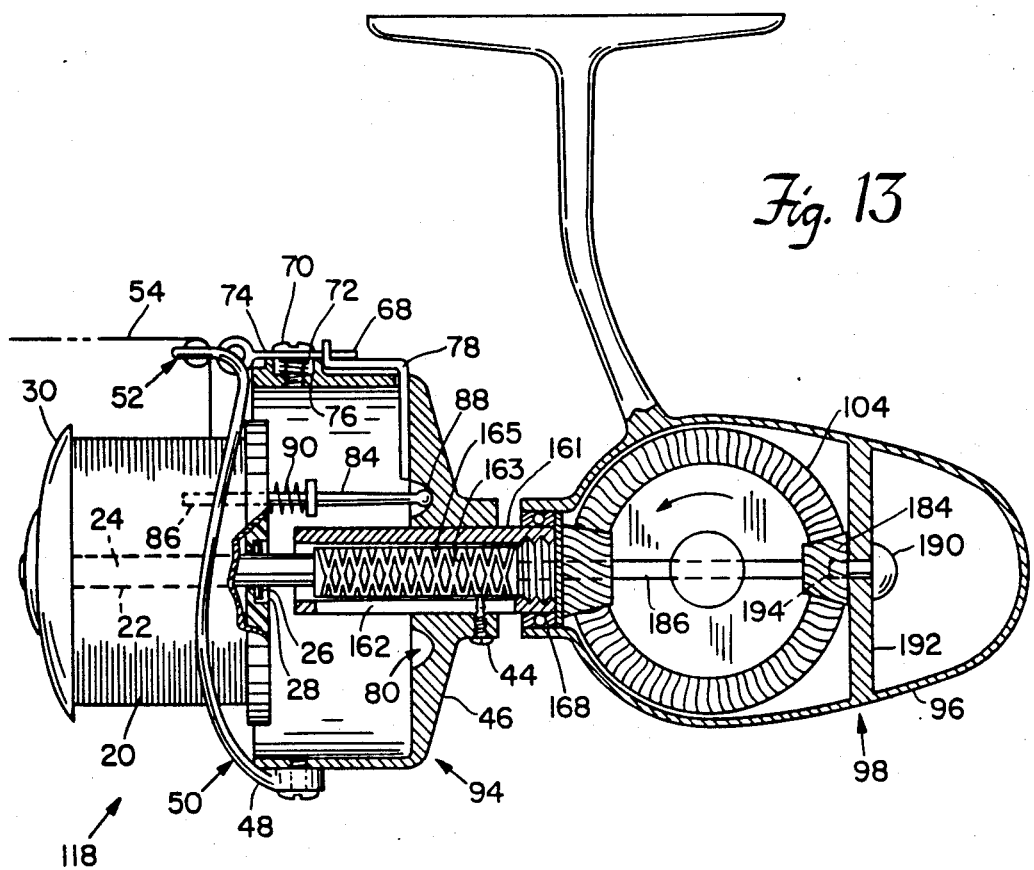

COMBINATION FISHING REEL

BACKGROUND OF THE INVENTION

This application is a continuation-in-part of Webb, U.S.S.N. 099,497, filed Sept. 27, 1987, now abandoned, hereby incorporated by reference.

The invention relates to fishing reels.

A common type of open face fishing reel is a spinning reel. The spinning reel is characterized by the use of a fixed-spool reel, which remains stationary when casting and retrieving. The axis of the spool is approximately parallel to the direction of a casted lurer. When a cast is made the pull of a lure uncoils the line from the spool as it travels through the air. Line is recovered by a rotating pickup mechanism, which engages the line and coils it about the spool. Some spinning reels have a spool which bobs back and forth along its axis as the pickup mechanism rotates about the spool to ensure an even wind.

The most common type of pickup mechanism is a bail pickup and consists of a metal hoop, which forms an arc across the face of the spool. The bail is set to a loaded position, away from the path of the uncoiling line during a cast, and to an unloaded position for retrieving line when a crank handle is rotated.

Another common type of open face fishing reel is a bait-casting reel. The bait casting reels differ from the spinning reels in that line is retrieved by a rotating spool which is positioned so that its axis is at a right angle to a line that has been cast.

SUMMARY OF THE INVENTION

A general feature of the invention is that fishing line is retrieved by rotating a spool positioned on a support member to allow line wound upon the spool to be discharged in a direction approximately parallel to the axis of the spool. The spool is rotated by a recovery means, and line is distributed onto the spool by a guide mechanism.

Preferred embodiments of the invention include the following features. The guide mechanism traverses the spool's axis when the spool is rotated. The mechanism consists of a guide having a guide bar for focusing the line onto the spool and a line retainer mechanism for retaining the line in close proximity to a roller. The spool is rotated by recovery means which includes a worm gear coaxially coupled to the spool. The worm gear has a continuous groove which traverses the gear. A follower secured to the guide mechanism is fitted within the groove of the worm gear and traces the groove when the worm gear is rotated by a gearing mechanism. The gearing mechanism includes a slipping mechanism which allows the spool to release line when line is pulled from the spool by a fish and a variable braking device for adjusting the amount of drag applied to the spool by the slipping mechanism.

Another general feature of the invention is that a spool is supported by a housing for rotation in a position that allows line coiled onto the spool to be discharged in a direction approximately parallel to the axis of the spool. The spool is rotated by rotating a hand crank coupled to the spool via a gear mechanism. A bail is coupled to the gear mechanism for traversing the spool's axis when the spool rotates to guide line onto the spool. A mechanism is provided for pivoting the bail from a loaded line disengaged position to an unloaded line engaged retrieval position when the hand crank is rotated.

Preferred embodiments of the invention include the following features. The bail includes a guide having a guide bar for focusing the line onto the spool and a line retainer mechanism for retaining the line in close proximity to the guide bar when line is wound onto the spool. A follower couples the bail to a worm gear having a continuous groove which traverses the gear. An anti-reverse device is provided for preventing the hand crank from back turning when line is pulled from the spool by a fish. A variable braking device is also provided for applying drag to the gear mechanism when line is pulled from the spool by a fish.

Another general feature of the invention is that both a hand crank and a spool are rotatably supported by a housing. Positioning the spool on the housing is such that it allows line wound upon the spool to be discharged in a direction approximately parallel to the axis of the spool. Rotating the spool is accomplished by a gear mechanism which compels the spool to rotate when the hand crank is rotated. A bail engages line and focuses it onto the spool when the spool is rotated. A follower couples the bail to a worm gear and traces a path formed by a groove disposed along the circumference of the worm gear. The follower causes the bail to traverse along the length of the axis of the spool. A device disengages the bail from a loaded position to an engaged retrieval position when the hand crank is rotated.

A preferred embodiment of the invention includes the following features. The gear mechanism includes a slipping device for allowing line to uncoil when pulled from the spool by a fish and a variable braking device for a fisherman to adjust the amount of drag applied to the slipping device.

When line is stored on the spool, it develops "a memory" of its coiled position. It is this memory together with the rotating action of the lure which contributes to an axial twisting of the line as it is reeled back onto the spool after a cast. If the line develops a significant amount of axial twist it will unravel on the spool resulting in what is commonly called a "bird nest". This invention helps prevent bird nests by combining the advantages of a bait casting reel and a spinning reel. Since the spool pulls the line over a traversing bail, much like the bait casting reel, it is straightened as it is recoiled onto the spool. The distance of the cast is not sacrificed with this reel, because the line is free to uncoil during a cast.

Another advantage is that the non-rotating bail is always positioned on top of the housing so that it is always in a casting position. Further, the drag system, such as the star drag system, is located so that a user will never have to take his hand off of the reel handle to adjust the drag.

PREFERRED EMBODIMENTS

We first briefly describe the drawings.

DRAWINGS

FIG. 1 is a longitudinal view of a fishing reel.

FIG. IA is a longitudinal sectional view of a fishing reel of FIG. 1.

FIG. 2 is an exploded perspective view of the worm gear of FIG. 1

FIG. 3 is an exploded sectional view of the guide of FIG. 1.

FIG. 4 is a perspective sectional view of the guide cam of FIG. 1.

FIGS. 5 and 6 are sectional views taken along the lines I—I on FIG. 1 with the bail in a loaded and a released position respectively.

FIG. 13 is a longitudinal sectional view of a combination fishing reel having a bail that rotates and traverses the axis of a spool which rotate in a direction opposite to that of the bail.

STRUCTURE

Figure 3A:
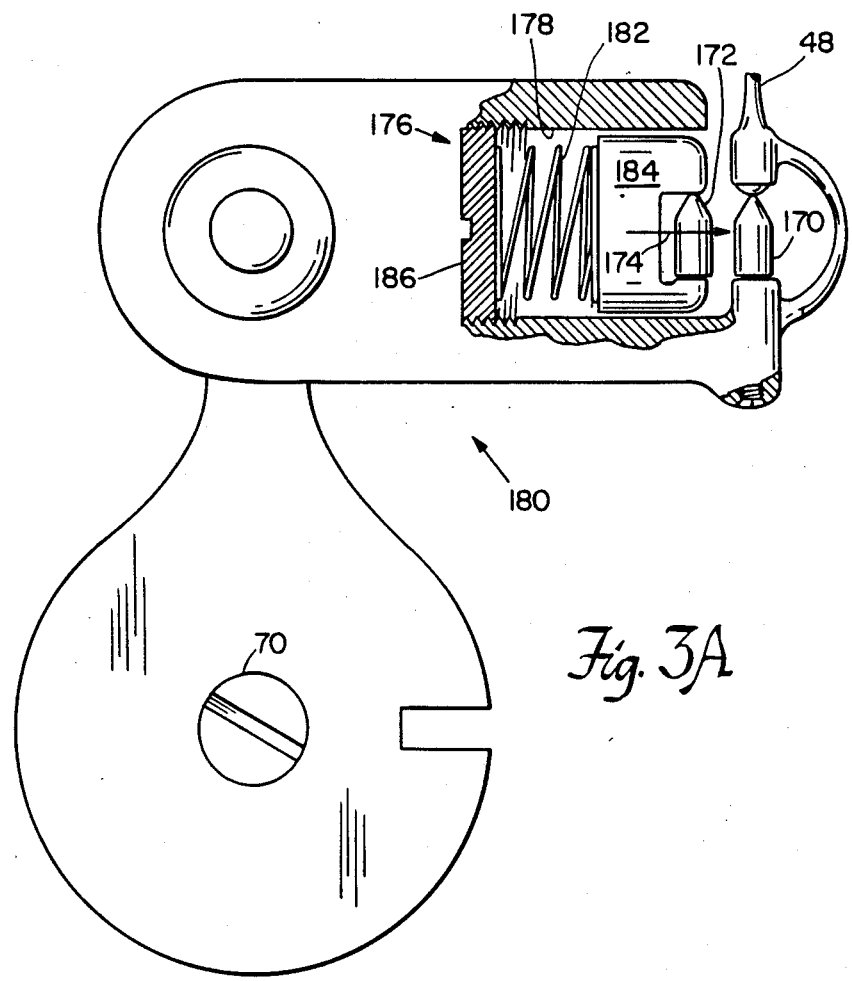
FIG. 3A is a partially cut away view of an alternate guide having two rollers biased together for sandwiching line as it is reeled onto a spool.

Generally the invention is an open-face fishing reel which combines some of the attributes of a spinning reel and a bait-casting reel. The reel, which will be referred to as a combination fishing reel, retrieves line by rotating a spool that is positioned on the reel so that its axis is approximately parallel to the line. As the rotating spool pulls the line, a bail assembly traverses along the axis of the spool untwisting the line and insuring an even wind.

A preferred embodiment of the combination fishing reel is shown in FIGS. 1 and 1A. Line is retrieved by operating a hand crank 100 mounted to a star drag system 102. The drag system includes a main drive gear 104, which engages with a pinion gear 106 coaxially mounted to a worm gear 36. Preferably the drag system 102 is the same type commonly used in bait casting fishing reels. One such drag system is called a star drag system and is made by Abu Garcia Co. of Fairfield, N.J. Essentially, this type of drag system allows the drive gear 104 to slip in a direction opposite to the direction of force as applied by a fisherman turning the hand crank 100 to retrieve line or by an anti-rotation switch 108. The anti-reverse switch 108 prevents the hand crank 100 from backturning by wedging a lever 110 between slanted teeth 112 of a ratchet gear 114 coaxially mounted to hand crank 100. By allowing the drive gear to slip, line is gradually unwound from a spool 20 and prevents the line from snapping when a fish makes a strong pull. Line tension is adjusted by a star handle 116 of the drag system.

Spool 20 is mounted to a shank portion 24 of a worm gear 36 between a key 26 secured to the shank 24 and a spool cover 30. The key 26 is disposed within a slot 28, formed at the bottom of spool 20, for driving the spool when the worm gear 36 is rotated. The spool cover 30, which is internally threaded to mate with a threaded portion of the shank (not shown), holds the spool against the key 26. The spool cover 30 may be replaced with a conventional brake plate, which is commonly used in spinning reels, for allowing a hooked fish to unwind line by letting the spool slip when a reel handle is held stationary by the fisherman or by the anti-reverse lock.

As shown in FIGS. 1A and 2, worm gear 36 has a groove 38 disposed along its surface to form a continuous path that traverses back and forth along the ear. A follower 44, mounted to a reel housing 46, extends through a slot 42 in a sleeve 40 coaxially disposed over worm gear 36 and slidably fits into the groove 38. Sleeve 40 is mounted to a gear housing 96 and is preferably made of polished stainless steel so that, as the worm gear 36 is rotated, follower 44 traces the path formed by groove 38 and causes reel housing 46 to traverse back and forth along the sleeve 40. To prevent reel housing 46 from rotating with spool 20, an anti-rotation shaft 92 is secured to a gear housing 96 at one end 98 and extends through a hole in the reel housing 46. As the reel housing 46 traverses the axis of the sleeve 40, it slides back and forth along shaft 92.

The reel housing 46 supports a bail 48 that consists of a helically curved wire 50 and a guide 52. In a line retrieval position, the wire 50 is used to engage line 54 and slide it onto guide 52. Guide 52, as shown in FIG. 3, includes a guide bar 56 tapered towards the middle of the bar and a line retainer mechanism 58. The guide bar 56 is used for focusing line 54 onto spool 20 as it is retrieved. A similarly tapered roller mounted on bearings may also be used. The line retainer mechanism 58 consists of a ball bearing 60 biased against a humped portion 66 of the guide 52 by a helical spring assembly 62. The purpose of line retainer mechanism 58 is only to keep line 54 in close proximity to the guide bar 56 as it is reeled onto the spool. The tension of the ball bearing 60 against the humped portion 66 should not prevent the line from slipping through to the guide bar 56 when line is initially retrieved.

Referring to FIG. 3A, an alternate guide is shown having two rollers 170, 172 biased together (as indicated by an arrow 174) by a spring and screw assembly 176. Each roller is suitably mounted so that it is free to rotate along its axis and is tapered at one end so that line slides into position between the rollers when it is retrieved. The rollers 170, 172 are preferably made of a lubricating material such a nylon or graphite so that the line is not damaged when it is reeled onto the spool. The spring and screw assembly 176 permits the bottom roller 174 to be adjusted to increase or decrease the tension on the line as it passes through the rollers.

The assembly 176 fits within a cavity 178 of a bail cam 180 and consists of a helical spring 182 sandwiched between a mounting block 184 supporting the bottom roller 172 and an adjustment screw 186. Tightening the screw 186 further compresses the spring 182 and increases the tension force between the rollers 170, 172 for straightening the line.

Referring to FIGS. 4, 5, and 6, bail 48 is pivotally connected to the reel housing 46 by a bail cam 68 at one end and a screw 49 at the other end. The bail cam 68 is biased toward an unloaded position (FIG. 6) by an internal torsion spring 72 (FIG. 1) when line is retrieved. In a loaded position (FIG. 5) or line casting position (FIG. 6), the bail cam 68 is held by a trip lever 78, which fits into a slot 81 formed along the cam's perimeter. Lever 78 is pivotally mounted to the interior of reel housing 46 by a screw 83 and is biased against bail cam 68 by a compression spring 82.

Referring also to FIG. 1, the lever 78 is disengaged from slot 81 by a pin 84, which rotates around a track 80 as indicated by an arrow 85 whenever spool 20 is rotated. Pin 84 is fitted within a shaft 86 formed within spool 20 and is biased against the cylindrical track 80 by a compressed helical spring 90. Spring 90 permits pin 84 to remain in contact with track 80 for tripping a loaded bail 48, regardless of the position of reel housing 46.

OPERATION

In preparation for a cast, bail 48 is pivoted to a loaded position (FIG. 5) and line 54 is held with a users extended index finger (not shown). As bail 48 is pivoted, trip lever 78 slides over the perimeter of bail cam 68 until bail 48 is fully extended and lever 78 engages with slot 81 of cam 68. The locks bail 48 in the line casting position. In this position, the bail 48 is disengaged from the line 54 and remote from the open end of spool 20. Line coiled on the spool is now free to be uncoiled when a lure is cast.

After the user completes his cast, hand crank 100 is rotated driving worm gear 36, which rotates the spool 20. During the first revolution of spool 20, pin 84 trips lever 78, which releases the bail cam 68. Simultaneously, bail 48 pivots to the unloaded position (FIG. 6) entrapping line 54. Fishing line 54 slides toward and onto the guide 56 as tension is placed on line 54. As line 54 is reeled onto spool 20, reel housing 46 cooperatively traverses the sleeve 40 via follower 44 when the worm gear 36 is rotated, which allows guide 52 to straighten and to distribute line 54 evenly onto spool 20.

ALTERNATE EMBODIMENTS

Figures 7, 8, 9:
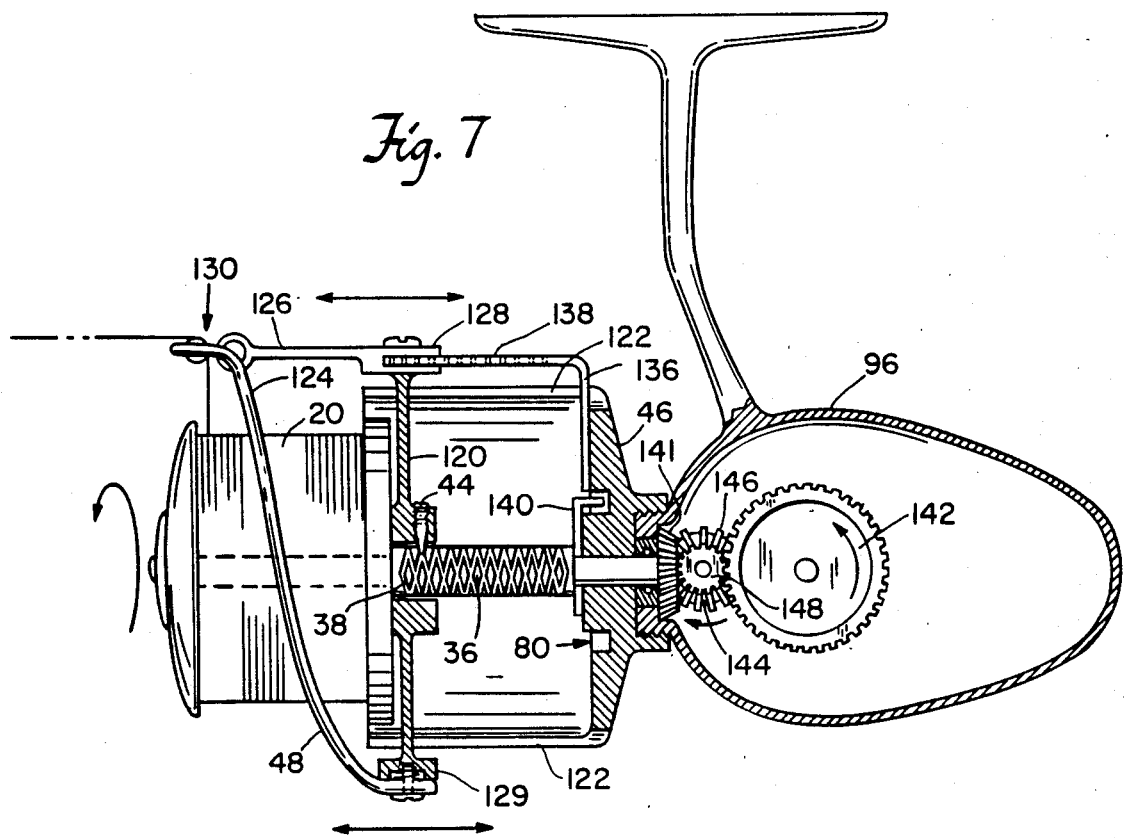
FIG. 7 is a longitudinal sectional view of an alternate fishing reel.
FIGS. 8 and 9 are sectional views of the pickup bracket of FIG. 7 with the bail in a loaded and a tripped position respectively.

Referring to FIG. 7, in another embodiment, bail 48 traverses along the axis of the spool 20 independently of the reel housing 46, which is secured to the gear housing 96. The bail 48 is driven by a bridge assembly 120 that slides back and forth along the rotating worm gear 36 via follower 44. The bridge assembly 120 includes a spring and screw assembly 129 for biasing the bail 48 to an unloaded position and a bail cam 128 for locking the bail 48 into a loaded position. Worm gear 36 is driven by a drive gear 142 that cooperatively engages with two beveled pinion gears 141 and 144. The drive gear 142 is rotated by the hand crank (not shown).

Figure 10:
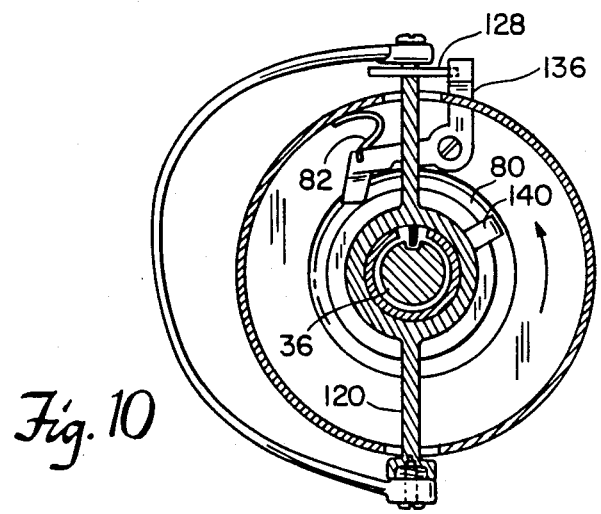
FIG. 10 is a sectional view along the lines II—II on FIG. 7.

As shown in FIGS. 8, 9, and 10, bail cam 128 includes a tooth 132 for engaging with one of several notches 134 of a lever 136. Multiple notches 134 along the side of the lever 136 allow the bail 48 to be loaded irregardless of the position of the bridge 120 with respect to the worm gear 36. Lever 136 is biased against the tooth 132 by a compression spring 82. When the spool is rotated, the bail is released by a trip lever 140 attached to worm gear 36.

Figure 11:
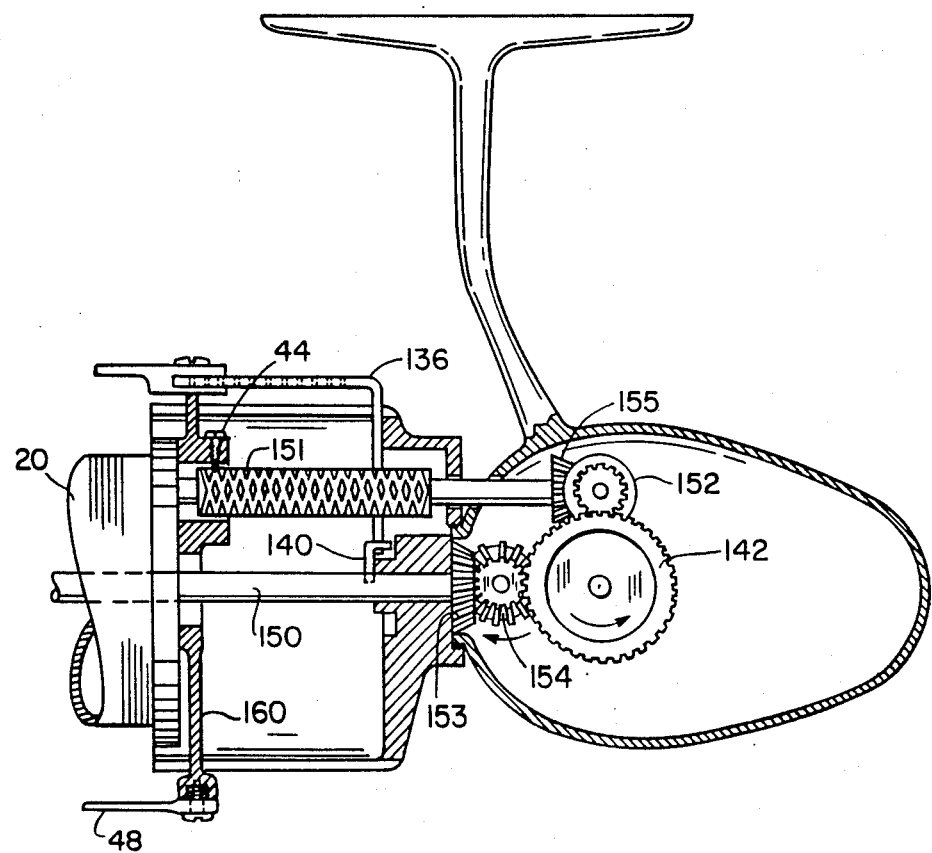
FIG. 11 is a longitudinal sectional view of a second alternate fishing reel.

As shown in FIG. 11, in another embodiment, bail 48 and spool 20 are independently operated. Spool 20 is driven by a shaft 150 that is connected to drive gear 142 by pinion gears 153 and 154. Bail 48 is driven by a worm gear 151, which is connected to drive gear 142 by pinion gears 152 and 155 via follower 44. As shown, the follower 44 is fitted to a bridge assembly 160 that does not interfere with the rotation of the spool. When the drive gear 142 is rotated, shaft 150 rotates the spool 20 and follower 44 traces the grooves of the worm gear 151 which drives the bail 48 back and forth along the axis of the spool 20.

Figure 12:
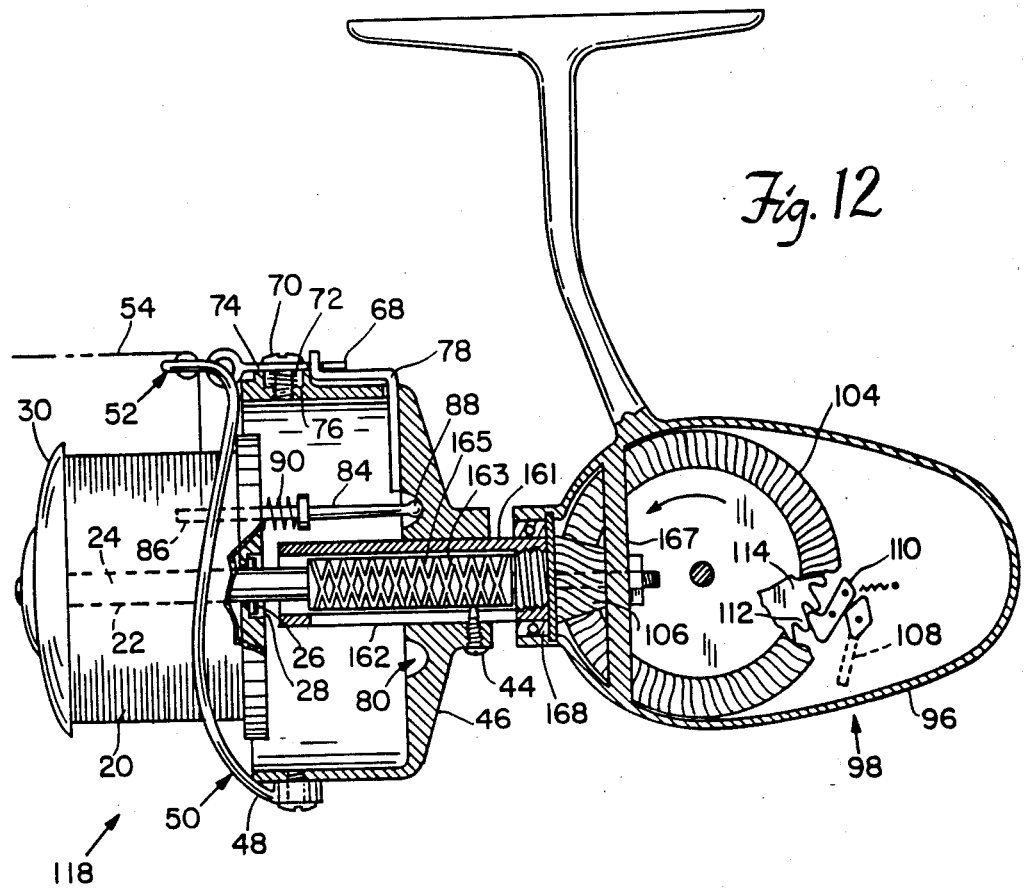
FIG. 12 is a longitudinal sectional view of a combination fishing reel having a bail that rotates and transverses the axis of a stationary spool.
Figure 12A:
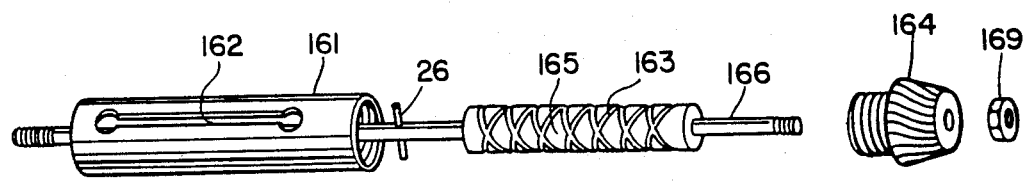
FIG. 12A is an exploded perspective view of the worm gear for driving the bail of FIG. 12.

Referring to FIGS. 12 and 12A, in a further embodiment, line 54 is retrieved by a bail 48 which rotates and traverses about the axis of a stationary spool 20. As shown the bail 48 is secured to the bail housing 46 in a similar manner as described above. The bail housing 46 is connected to a worm gear 165 via follower 44 that extends through a slot 163 of a sleeve 161, which is preferably made of polished stainless steel to permit the bail housing 46 to easily slide back and forth along its exterior surface. The sleeve 162 is threadably connected to one end of a pinion gear 164 which engages drive gear 104. The pinion gear 164 is free to rotate between a support beam 167 of the gear housing 96 and a bearing 168 and about a shaft 166 of a worm gear 165 which extends through the center of the pinion gear 164. A nut 169 anchors the worm gear 165 to the support beam 167. The bail housing traverses the axis of the spool 20 when follower 44, threaded to the bail housing 76, traces the path of the grooves 182 in the worm gear 176 and slides back and forth within a slot 162 of the sleeve 161 as it is rotated.

Referring to FIG. 13, in still another embodiment line 54 is more quickly retrieved by rotating the bail 48 and the spool 20, in opposite directions. The bail 48 and the bail housing 46 are connected to the gear housing 96 in the same manner as described above. In addition to the bail rotating and traversing about the axis of spool 20, the spool 20 is rotated in an opposite direction by a second pinion gear 184 secured to a shaft 186 of a worm gear 165. A pin 190 extends through a beam 192 in the gear housing 96 to a recess 194 at the center of the pinion gear 184 to hold it in place during the reel's operation.

Other embodiments are within the following claims. For example, various types of guides may be employed. Also different gearing or combination drag systems may be used in place of the star drag system. Different types of bail systems other than a helical wire may also be used.

I claim:
1. Fishing reel comprising:
a support member;
a spool rotatably mounted on the support member, said spool positioned on the support member to allow line wound upon the spool to be discharged in a direction approximately parallel to the axis of the spool;
recovery means for rotating the spool about its axis for retrieving line, the recovery means comprising:
a worm gear coaxially coupled to the spool, the worm gear having a continuous groove which traverses the gear; and
a gearing mechanism for rotating the worm gear about its axis;
a guide mechanism for distributing line onto the spool when the recovery means rotates the spool;
a follower secured to the guide mechanism and fitted within the groove of the worm gear for tracing the path of the groove when the worm gear is rotated thereby causing the guide mechanism to traverse the axis of the spool; and
means for pivoting the guide mechanism from a loaded line disengaged position to a line engaged retrieval position when the spool is rotated.
2. A fishing reel as claimed in claim 1 wherein the support member includes a reel housing having means for pivotally supporting the guide mechanism between a line engaged retrieval position and a line disengaged position and a gear housing for supporting the recovery means.
3. A fishing reel as claimed in claim 1, wherein the guide comprises a guide bar for focusing the line onto the spool and a line retainer mechanism for holding the line in close proximity to the guide bar.

4. A fishing reel as claimed in claim 1 wherein the guide mechanism comprises two rollers for sandwiching line between the rollers and an adjustable mechanism for biasing one roller against the other to straighten line as it is coiled onto the spool.

5. A fishing reel as claimed in claim 1 wherein the gearing mechanism is a star drag system.

6. A fishing reel as claimed in claim 1 further comprising an anti-reverse mechanism coupled to the gearing mechanism for preventing a handle, used by a fisherman for driving the gearing mechanism, from back turning.

7. A fishing reel comprising:
   a housing including a gear housing and a reel housing;
   a spool supported by the gear housing for rotation to pull line onto the spool, wherein the spool is positioned on the housing for allowing the line coiled onto the spool to be discharged in a direction approximately parallel to the axis of the spool;
   a hand crank rotatably supported by the gear housing;
   a gear mechanism coupled between the hand crank and the spool, wherein rotation of the crank compels the spool to rotate, the gear mechanism comprising:
   a worm gear coaxially coupled to the spool, the worm gear having a continuous groove that traverses the gear; and
   a second gear mechanism coupled to the hand crank for rotating the worm gear;
   a bail, supported by the reel housing and having a follower secured to the bail and slidably disposed within the groove of the worm gear, for traversing along the axis of the spool when the spool rotates to guide the line onto the spool; and
   a mechanism for pivoting the bail from a loaded line disengaged position to an unloaded line engaged retrieval position when the hand crank is rotated.

8. A fishing reel as claimed in claim 7 wherein the bail comprise a guide having a guide bar for focusing line onto the spool and a line retainer mechanism for retaining line in close proximity to the roller when line is wound onto the spool.

9. A fishing reel as claimed in claim 7 wherein the bail comprises a guide having two rollers for sandwiching line between the rollers and an adjustable mechanism for biasing one roller against the other to straighten line as it is coiled onto the spool.

10. A fishing reel as claimed in claim 7 further comprising an anti-reverse device for preventing the hand crank from back turning.

11. A fishing reel comprising:
    a housing;
    a hand crank rotatably supported by the housing;
    a spool rotatably supported by the housing, wherein the spool is positioned on the housing to allow line wound upon the spool to be discharged in a direction approximately parallel to the axis of the spool.
    a worm gear coaxially coupled to the spool, the worm gear having a continuous groove that traverses the worm gear;
    a gear mechanism coupled to the worm gear and the hand crank, wherein rotation of the hand crank compels the spool to rotate;
    a bail for engaging and focusing line onto the spool when the spool is rotated;
    a follower coupled to the bail and slidably disposed within the groove of the worm gear for tracing the path of the groove and causing the bail to traverse along the axis of the spool; and
    a device for pivoting the bail from a loaded disengaged position to an engaged retrieval position when the hand cranks is rotated.

12. A combination fishing reel comprising:
    a spool for retaining line, wherein said spool is mounted on the reel to allow line wound upon the spool to be discharged in a direction approximately parallel to the axis of the spool;
    a bail for coiling line onto the spool; and
    a recovery mechanism for rotating and traversing the bail along the axis of the spool for evenly distributing line as it is coiled onto the spool, the recovery mechanism comprising:
    a worm gear coaxially coupled to the bail, the worm gear having a continuous groove which traverses the gear;
    a gearing mechanism for rotating the worm gear about its axis; and
    a follower secured to the bail and fitted within the groove of the worm gear for tracing the path of the groove when the worm gear is rotated and causing the bail to rotate and traverse the axis of the spool.

13. A combination fishing reel of claim 12 wherein the recovery mechanism further comprises means for rotating the spool in an opposite direction of the rotating bail.

14. A combination fishing reel of claim 12 wherein the bail comprises a guide for focusing line onto the spool.

15. A combination fishing reel of claim 14 wherein the bail comprises a guide bar for focusing the line onto the spool and a line retainer for holding the line in close proximity to the guide bar.

16. A combination fishing reel of claim 14 wherein the bail comprises two rollers for sandwiching line between the rollers and an adjustable mechanism for biasing one roller against the other to straighten line as it is coiled onto the spool.

* * * * *